(12) United States Patent
Bonin

(10) Patent No.: US 6,282,066 B1
(45) Date of Patent: *Aug. 28, 2001

(54) MICROACTUATOR SUSPENSION WITH MULTIPLE NARROW BEAMS

(75) Inventor: Wayne A. Bonin, North Oaks, MN (US)

(73) Assignee: Seagate Technology LLC, Scotts Valley, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/148,178

(22) Filed: Sep. 4, 1998

Related U.S. Application Data (60) Provisional application No. 60/078,905, filed on Mar. 20, 1998.

(51) Int. Cl.[7] ............................... G11B 5/55; G11B 21/08
(52) U.S. Cl. ............................................. 360/294.1
(58) Field of Search ............................. 360/290, 294, 360/294.1, 244.2, 244.5, 244.3, 244.4, 291.6, 291.9, 292

(56) References Cited

U.S. PATENT DOCUMENTS

| | | | |
|---|---|---|---|
| 3,706,861 | * 12/1972 | Giel | 360/75 |
| 3,863,124 | 1/1975 | Pierce et al. | 318/638 |
| 3,914,541 | 10/1975 | Elliott | 178/6.6 R |

(List continued on next page.)

FOREIGN PATENT DOCUMENTS

| | | |
|---|---|---|
| 549 814 | 7/1993 | (EP). |
| 363134655 | * 6/1988 | (JP). |
| 64-271601 | 10/1989 | (JP). |
| 405047126 | * 2/1993 | (JP). |
| 10092135 | * 4/1998 | (JP). |

OTHER PUBLICATIONS

D. Horsley et al. "Angular Micropositioner for Disk Drives," Tenth Annual International Workshop on Micro Electro Mechanical Systems, Nagoya, Japan, Jan. 26–30, 1997.*

K. Deng et al, Jan. 31, 1998, "Outer–Rotor polysilicon wobble micromotors," Sensors and Actuators A (Physical), v. A64, No. 3, pp. 265–271.*

Fan et al; "Magnetic Recording Head Positioning at Very High Track Densities Using a Microactuator–Based, Two–Stage Servo System," Jun. 1995, IEEE Trans. v. 42 No. 3, pp. 222–233.*

"Development of Integrated Suspension System for a Nanoslider with an MR Head Transducer", by Takeshi Ohwe, Yoshifumi Mizoshita, and Seiji Yoneoka Fujitsu Laboratories Ltd., 10–1 Morinosato–Wakamiya, Atsugi 243–01, Japan, *IEEE Trans. Magnetics*, vol. 29, No. 6 (Nov. 1993), pp. 3924–3926.

Front page and pages B–1–B–4 of *The Japan Industrial Journal*, 1993.

(List continued on next page.)

*Primary Examiner*—A. J. Heinz
*Assistant Examiner*—Julie Anne Watko
(74) *Attorney, Agent, or Firm*—Joseph R. Kelly; Westman, Champlin & Kelly, P.A.

(57) ABSTRACT

A microactuator suspension having a stator portion for connection to a gimbal, a rotor portion for connection to a slider and a plurality of microbeams connected therebetween. The microbeams have an aspect ratio of 30:1, 60:1, 90:1, 120:1 or more. The microbeams may be manufactured from a material that is different than the material of the stator, such as Titanium, Tungsten, Molybdenum, Nickel or Silicon Nitride.

13 Claims, 6 Drawing Sheets

U.S. PATENT DOCUMENTS

| | | | |
|---|---|---|---|
| 4,314,295 | | 2/1982 | Frandsen .................... 360/266.9 |
| 4,520,570 | * | 6/1985 | Bednorz et al. .................... 33/613 |
| 4,605,977 | | 8/1986 | Matthews .................... 360/234.7 |
| 4,802,033 | | 1/1989 | Chi .................... 360/77.04 |
| 4,855,851 | * | 8/1989 | Radwan et al. .................... 360/244.5 |
| 4,858,040 | | 8/1989 | Hazebrouck .................... 360/78.05 |
| 5,055,731 | | 10/1991 | Nihei et al. .................... 310/309 |
| 5,061,914 | | 10/1991 | Busch et al. .................... 337/140 |
| 5,140,482 | * | 8/1992 | Kimura et al. .................... 360/264.2 |
| 5,166,847 | * | 11/1992 | Zak .................... 360/245.1 |
| 5,185,681 | | 2/1993 | Volz et al. .................... 360/77.05 |
| 5,189,578 | | 2/1993 | Mori et al. .................... 360/294.6 |
| 5,216,559 | | 6/1993 | Springer .................... 360/294.5 |
| 5,257,149 | | 10/1993 | Meyer .................... 360/78.14 |
| 5,291,355 | | 3/1994 | Hatch et al. .................... 360/97.01 |
| 5,303,105 | | 4/1994 | Jorgenson .................... 360/294.3 |
| 5,325,244 | | 6/1994 | Takano et al. .................... 360/77.03 |
| 5,378,954 | | 1/1995 | Higuchi et al. .................... 310/309 |
| 5,404,255 | | 4/1995 | Kobayashi et al. .................... 360/78.09 |
| 5,446,609 | | 8/1995 | Thanos et al. .................... 360/97.02 |
| 5,452,151 | | 9/1995 | Money et al. .................... 360/75 |
| 5,473,488 | * | 12/1995 | Gustafson et al. .................... 360/245.5 |
| 5,477,103 | | 12/1995 | Romano et al. .................... 318/601 |
| 5,493,156 | | 2/1996 | Okada .................... 310/40 |
| 5,521,778 | | 5/1996 | Boutaghou et al. .................... 360/264.5 |
| 5,586,306 | | 12/1996 | Romano et al. .................... 395/500 |
| 5,657,188 | | 8/1997 | Jurgenson et al. .................... 360/294.3 |
| 5,724,211 | * | 3/1998 | Higashiya et al. .................... 360/244.4 |
| 5,745,319 | | 4/1998 | Takekado et al. .................... 360/78.05 |
| 5,781,381 | * | 7/1998 | Koganezawa et al. .................... 360/294.3 |
| 5,793,571 | | 8/1998 | Jurgenson et al. .................... 29/603.25 |
| 5,856,967 | * | 1/1999 | Mamin et al. .................... 369/126 |
| 5,877,919 | * | 3/1999 | Foisy et al. .................... 360/244.6 |
| 5,898,541 | * | 4/1999 | Boutaghou et al. .................... 360/294.4 |
| 5,986,853 | * | 11/1999 | Simmons et al. .................... 360/245.9 |
| 5,995,328 | * | 11/1999 | Balakrishnan .................... 360/245.9 |
| 6,002,549 | * | 12/1999 | Berman et al. .................... 360/294.4 |

OTHER PUBLICATIONS

"Magnetic Hard Disk Drive Form Factor Evolution", by Edward G. Grochowski, Roger F. Hoyt, and John S. Heath, *Proceedings of the 1993 JSME*, pp. 521–526. Aug. 1993.

S. Nakamura, K. Suzuki, M. Ataka and H. Fujita, "An Electrostatic Micro Actuator for a Magnetic Head Tracking System of Hard Disk Drives", 1997 International Conference on Solid–State Sensors and Actuators, Chicago, Jun. 16–19, 1997, pp. 1081–1084.

"Silicon microactuators for rigid disk drives", by Denny K. Miu, Jul./Aug. 1995, *Data Storage*, pp. 33–40.

* cited by examiner

MICROACTUATOR SUSPENSION WITH MULTIPLE NARROW BEAMS

CROSS-REFERENCE TO RELATED APPLICATION

This application claims priority to Provisional Application Ser. No. 60/078,905, filed Mar. 20, 1998, entitled USING MULTIPLE, NARROW BEAMS IN PARALLEL TO INCREASE THE VERTICAL LOAD CAPACITY TO LATERAL STIFFNESS RATIO IN A MICROACTUATOR, AND METHOD OF PRODUCTION OF NARROW BEAMS, the entire disclosure of which is hereby incorporated by reference.

This application is related to U.S. patent application Serial No. 09/048,750, filed on Mar. 26, 1998, entitled MICROACTUATOR SUSPENSION WITH MULTIPLE "I" SHAPED MICROBEAMS, which claims priority to provisional application no. 60/067,703 filed on Dec. 4, 1997 entitled USING "I" SHAPED BEAMS TO INCREASE THE VERTICAL LOAD CAPACITY TO LATERAL STIFFNESS RATIO IN A MICROACTUATOR, AND METHOD OF FABRICATION, the entire disclosures of which are hereby incorporated by reference.

BACKGROUND OF THE INVENTION

The present invention generally relates to the field of disc drives. More specifically, the present invention relates to the field of microactuators for use in disc drives.

Computer systems play a vital and integral role in our modern society and we have come to rely heavily on computer systems in our everyday life. From a simple home computer system to help us with our business, personal and entertainment needs, to a meteorological computer system that models atmospheric patterns to generate a weather forecast, to a traffic control computer system that helps maintain traffic flow, to a telecommunications computer system that routes thousands of telephone calls every minute, computers have a vast and significant impact on our everyday life that is difficult to comprehend.

A critical part of every computer system is a data storage system for storing bits of data or digital information. Electronic memory banks store limited quantities of data that may be useful in small scale computer systems. However, most computer systems utilize vast quantities of data that must be stored by a more practical means. Magnetic disc drives were developed to accommodate the need for a practical and efficient means to store large quantities of information.

Magnetic disc drives typically include one or more flat discs that have a magnetic medium coated on each surface. The magnetic surface on the disc may be modified to write information onto the disc or the magnetic field pattern on the surface may be detected to read information from the disc. In this manner, information may be stored on and retrieved from the disc.

Magnetic disc drives also typically include one or more magnetic heads that perform the reading and writing function. Each magnetic head is positioned over the disc surface at precise locations using an actuator assembly. With this arrangement, the surface of the disc may be divided into discrete tracks each defining a separate radial position on the disc surface. The actuator assembly moves the magnetic head over the desired track to read or write data at that location.

Disc drives have evolved into highly complex electromechanical systems involving many specialized components, rendering a more detailed description of a typical magnetic disc drive necessary for a full understanding of the present invention.

Magnetic disc drives generally utilize a plurality of rigid discs including a magnetizable medium coated on each side or surface of the disc. The discs are rigidly mounted on a spindle motor to form a stack of spaced-apart discs rotatable about the axis of the spindle motor. The discs are mounted such that the axis of the spindle motor (i.e., the axis of rotation) is orthogonal to the disc surface.

Adjacent each disc surface is a magnetic head or slider that "flies" above the disc due to aerodynamic or hydrodynamic lift. Each slider includes an air bearing surface facing the disc surface which creates the lift relative to the rotating disc surface. Each slider also includes one or more transducers that read and/or write to the magnetic medium on the disc surface. Inductive type transducers capable of both reading from and writing to the disc surface may be used alone or in conjunction with MR (magnetoresistive) type transducers capable of reading from the disc.

It is important that the slider remain in close proximity to the disc surface in order to maintain the proper interaction between the transducer(s) on the slider and the magnetic media on the disc surface. As such, it is necessary to compensate for the aerodynamic lift imposed on the slider. This may be accomplished by utilizing a pre-loaded suspension connected to the slider. The proximal end of the suspension is connected to a track accessing arm or primary actuator which is rotatable about an axis orthogonal to the disc surface but is fixed in all other directions. The distal end of the suspension is connected to the slider and exerts a normal force by elastic beam deflection in a direction opposite that of the aerodynamic lift.

The suspension includes a flexible portion referred to as a gimbal and a relatively rigid portion referred to as a load beam. The gimbal portion of the suspension allows the slider to move in the pitch and roll directions and is typically a separate part welded to the load beam portion of the suspension. The gimbal portion may be formed from a thinner material than the load beam to increase its pitch and roll compliance. Alternatively, the gimbal may be formed from partially etched material or from the load beam material itself.

The load beam, which transfers the preload force to the slider, is typically made by forming stiffening webs or flanges along the longitudinal edges of the suspension. Alternatively, the rigid load beam portion may be formed by depositing circuit layers on the suspension material.

The pre-loaded force is typically on the order of 0.5 gmf to 4.0 gmf which allows the slider to fly above the disc surface when the disc is rotating at nominal speed, but otherwise causes the slider to be in contact with the disc surface. Because of the potential damage caused by friction between the slider and the rotating disc at sub-nominal speeds, a landing and take-off zone may be provided on the disc surface. The landing and take-off zone has a low coefficient of friction thus reducing the potential for damage to the slider.

The track accessing arm or primary actuator includes a proximally mounted voice coil and a distally mounted extension arm which is connected to the proximal end of the suspension. The voice coil interacts with a magnet to effect controlled rotation of the primary actuator about an axis of rotation (z-axis) orthogonal to the disc surface and disposed between the voice coil and the extension arm. In this manner, the primary actuator moves the slider from track to track across the surface of the disc.

The preload force is typically applied to the slider through a dimple or load button which bears on the back surface of the slider. Alternatively, the preload force is applied through the gimbal structure. The point of preload application is defined as the suspension load point.

In some instances, it is desirable to have a secondary actuator to make minor adjustments in the position of the slider. For example, it may be desirable to correct for off-track errors due to non-concentric tracks or skew angle variance. In addition, it may be desirable to correct for fly height variations due to changes in aerodynamic lift caused by a difference in disc surface speed (inside vs. outside tracks) or a difference in altitude. This may be accomplished by using a microactuator connected between the slider and the suspension for fine positioning of the slider.

Microactuators may also be useful for decreasing the access time of the drive. A microactuator capable of moving the slider to an adjacent track or across a number of tracks would enable seek operations to be performed using the microactuator only, which is faster than using the primary actuator.

SUMMARY OF THE INVENTION

Applying the preload force to the slider via a dimple or via a gimbal restricts the off-track motion of the slider at the suspension load point. When the preload force is applied to the slider through a dimple, the microactuator must overcome friction between the dimple and the slider surface to move the slider in the off-track direction.

However, microactuators are only capable a generating small amounts of force, typically on the order of 100 $\mu$N, which is insufficient to overcome the frictional forces encountered when using a dimple and is insufficient to overcome the lateral stiffness of prior art gimbal structures. Accordingly, there is a need for improved suspension assemblies that address these friction and stiffness issues in order to accommodate microactuation.

The improved suspension assemblies should be very flexible in the direction of the desired microactuation such that the small amount of force generated by the microactuator is able to quickly and easily move the slider. The improved suspension assembly should also be very stiff in all other directions to eliminate or at least minimize unwanted modes.

The present invention provides a microactuator suspension that is sufficiently flexible for low-force microactuation and sufficiently stiff for minimizing unwanted modes. The present invention also provides a method to manufacture such a microactuator suspension.

The present invention may be described as a microactuator suspension having a stator portion for connection to a gimbal, a rotor portion for connection to a slider and a plurality of microbeams connected therebetween, wherein the microbeams have an aspect ratio of 30:1 or more. In a preferred embodiment, the microbeams have an aspect ratio of 60:1, 90:1, 120:1 or more. The microbeams may be manufactured from a material that is different than the material of the stator, such as Titanium, Tungsten, Molybdenum, Nickel or Silicon Nitride.

The present invention may also be described as a method of manufacturing high aspect ratio microbeams. The method includes the steps of etching a substrate to form a plurality of slots therein and subsequently depositing a microbeam material onto each of the surfaces. The substrate material is then removed to expose the microbeam material. A filler material may be placed into the slots after the microbeam material has been deposited. The total thickness of the microbeam deposition may be less than 6 $\mu$m and preferably 2 $\mu$m or less. The aspect ratio of the microbeam deposition may be 30:1 or more and preferably 60:1, 90:1, 120:1 or more.

The present invention may also be described as a microactuator suspension having microbeams wherein the microbeams are made by depositing a microbeam material onto a substrate and subsequently removing the substrate.

DETAILED DESCRIPTION OF THE PREFERRED EMBODIMENTS

The following detailed description should be read with reference to the drawings in which like elements in different drawings are numbered identically. The drawings, which are not necessarily to scale, depict selected embodiments and are not intended to limit the scope of the invention.

Examples of materials, dimensions and manufacturing processes are provided for some selected elements. Those skilled in the art will recognize that many of the examples provided have suitable alternatives which may also be utilized.

It is also contemplated that the present invention is suitable for use with optic, magneto-optic and other types of disc drives. By way of example, not limitation, the following detailed description illustrates the application of the invention to magnetic disc drive systems.

Figure 1:
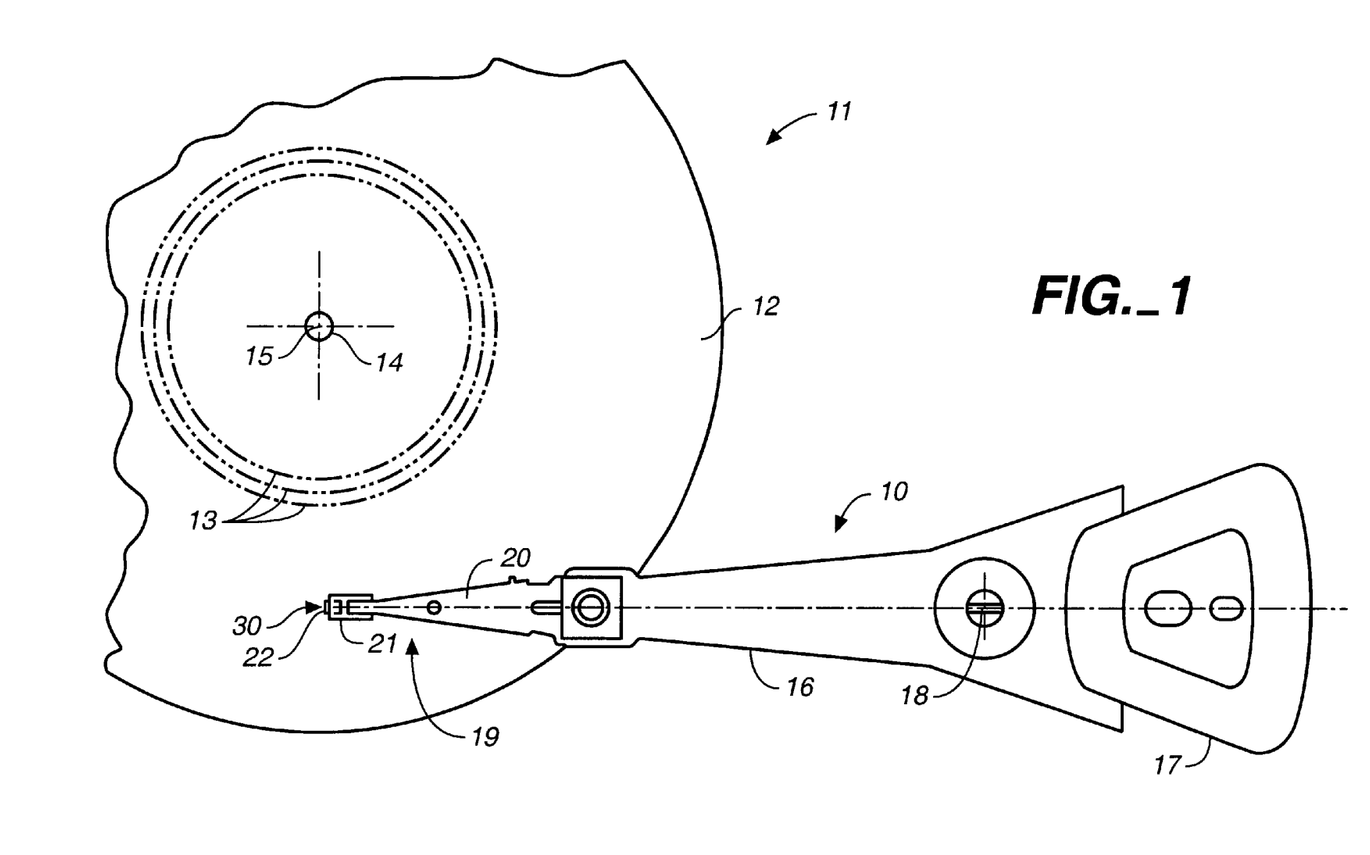
FIG. 1 is a plan view of selected components of the disc drive system of the present invention.

Refer now to FIG. 1 which illustrates selected components of the disc drive system of the present invention. The disc drive system of the present invention includes one or more rigid discs 11 including a magnetizable medium coated on each side or surface 12 of the disc. The discs 11 are rigidly mounted on a spindle 14 of a spindle motor (not shown) to form a stack of spaced-apart discs rotatable about an axis of rotation 15. The magnetizable medium coated on the disc surface 12 may include one or more tracks 13 to organize data thereon. Adjacent the disc surface 12 is a slider 22 that flies above the disc surface 12 due to aerodynamic properties of the slider relative to the rotating disc 11. The slider 22 includes an air bearing surface (not shown) which faces the disc surface 12 and creates the aerodynamic lift.

Figure 2:
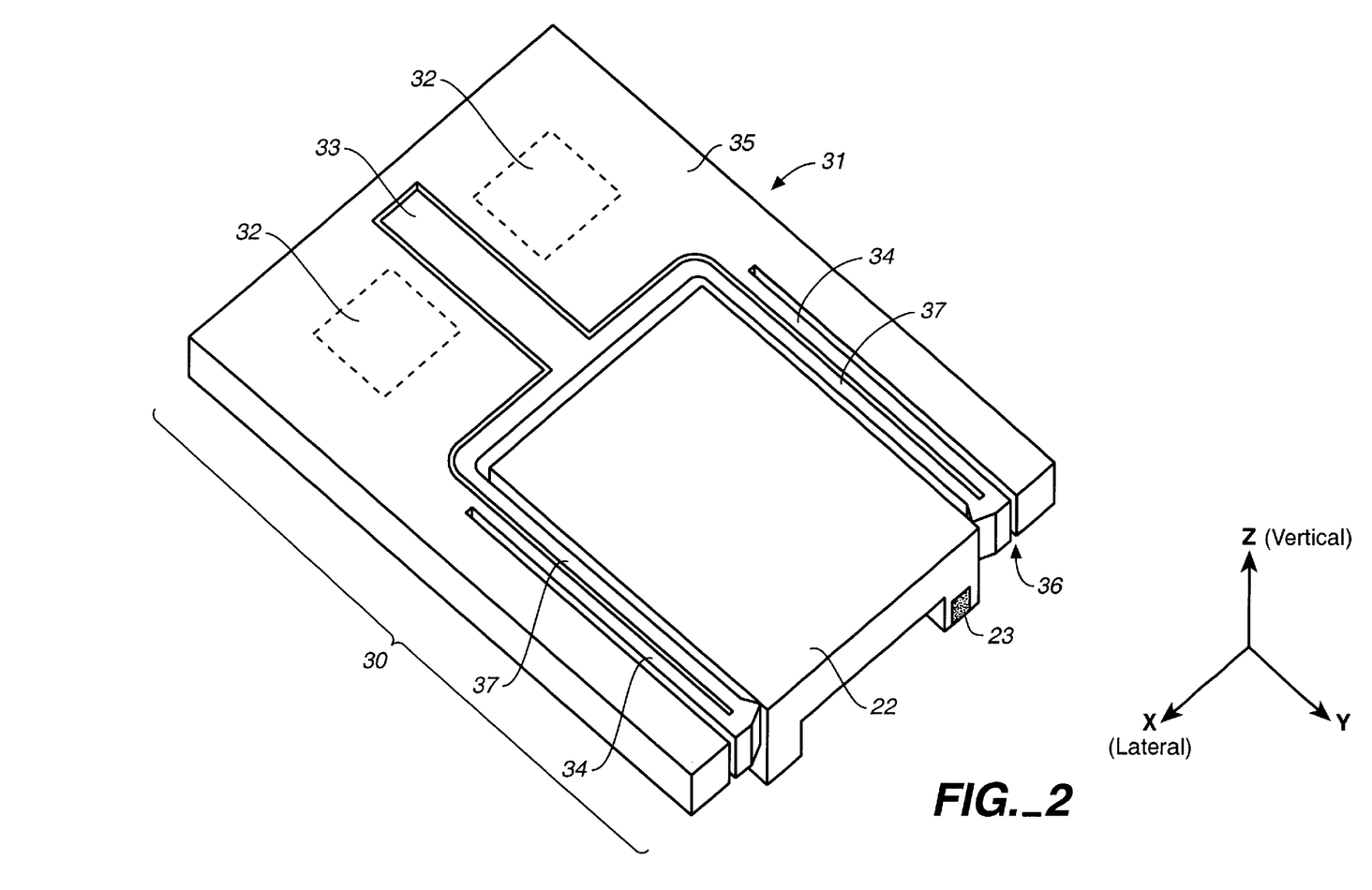
FIG. 2 is an isometric plan view of the microactuator assembly of the present invention.

The slider 22 includes a transducer 23 (as best seen in FIG. 2) that reads and/or writes digital data to the magnetic disc surface 12. Transducer 23 may be an inductive type transducer capable of both reading and writing digital information to the disc surface 12 which may be used alone or in conjunction with an MR (magnetoresistive) type transducer capable of reading digital data from the disc surface 12.

In order to maintain the transducer 23 in close proximity to the disc surface 12, a primary suspension assembly 19 is connected to the slider 23. The primary suspension assembly includes a proximal load beam portion 20 and a distal gimbal portion 21. The load beam 20 transfers a preload force to the slider in a direction opposite to the aerodynamic lift. The distal gimbal portion 21 of the primary suspension assembly 19 allows the slider 22 to move in the pitch and roll directions. The preload force from the load beam 20 is applied to the microactuator assembly 30 through gimbal 21.

The proximal end of the load beam 20 is connected to the distal portion of the primary actuator 10. The primary actuator 10 includes a proximally mounted voice coil 17 and a distally mounted arm extension 16. The distal end of the arm extension 16 is connected to the proximal end of the load beam 20. The voice coil 17 interacts with a magnet (not shown) to affect controlled rotation of the primary actuator 10 about an axis of rotation 18. In this manner, the primary actuator 10 moves the slider 22 from track to track 13 across the surface 12 of the disc 11 in order to read and/or write information to and from desired locations on the disc surface 12.

Refer now to FIG. 2 which illustrates an isometric plan view of a microactuator assembly 30 of the present invention. Microactuator assembly 30 includes microactuator suspension 31 which holds slider 22. Microactuator suspension 31 includes a slider clip 37 and a plurality of microbeams 34. Preferably, several microbeams 34 would be utilized on each side of the microactuator suspension 31. However, for sake of clarity, only one microbeam 34 is illustrated on either side of microactuator suspension 31.

Microactuator suspension 31 also includes microactuators 32 disposed on either side of microactuator tongue 33. Microactuators 32 may be electromagnetic coils connected to control circuitry (not shown). The microactuators 32 effect lateral displacement of the microactuator tongue 33 which may contain a magnetically responsive material. Lateral actuation of the microactuator tongue 33 causes substantially lateral actuation of the slider 22 and thus microactuation of the transducer 23. In this manner, microactuator assembly 30 facilitates fine off-track positioning of transducer 23.

Microbeams 34 should be sufficiently flexible in the off-track direction to permit actuation of the microactuator tongue 33 in response to the small forces generated by microactuators 32. Microbeams 34 should also be sufficiently stiff in all other directions to prevent unwanted modes.

Microactuator assembly 30 may be connected to the gimbal 21 by utilizing stand-offs (not shown) disposed on either side of the microbeams 34 and disposed on either side of microactuator tongue 33. First and second bridges (not shown) may span across the slider 22 and the microactuator tongue 33 and rest on the stand-offs. The bridges may be adhesively connected to the standoffs. The gimbal 21 may have its tongue spring portion (not shown) connected to the bridge spanning the microactuator tongue 33. The bridge spanning the slider may be connected to the flex arm portions (not shown) of the gimbal 21.

As stated previously, it is desirable for the microbeams 34 to have a relatively high stiffness in the Z and Y directions and a relatively low stiffness in the X direction in order to minimize unwanted modes and accommodate the relatively low microactuation forces generated by the microactuators 32.

In order to understand the performance of the microbeams 34, beam theory may be applied to a single beam model and then modified for a multiple beam model. First consider a single beam model wherein the beam has a length L, a depth d and a width b. A vertical preload force $W_v$ is applied in the vertical direction to cause a vertical deflection Y. A lateral load force $W_L$ is applied by the microactuator 32 to result in a lateral deflection X. The beam is made of a material having a maximum fiber stress σ and an elastic modulus E. Assuming the beam is fixed at one end to the microactuator stator 35 and attached to the microactuator rotor/slider support 36 on the other end, with the head preload force applied at the center of the slider in line with the point of attachment of the slider support, the required total width of the beam ($b_t$) is given by Equation 1 as derived from well known stress modeling.

$$b_t = \frac{6W_v L}{\sigma d^2} \qquad \text{Equation 1}$$

Applying well known beam theory, the lateral stiffness ($W_L/x$) for a single beam is given by a Equation 2.

$$\frac{W_L}{x} = \frac{Edb^3}{4L^3} \qquad \text{Equation 2}$$

Now consider a multiple beam model utilizing two parallel beams. Since the ends of the beams remain parallel to each other in order to move the slider in a relatively linear path rather than an arcuate path, the lateral stiffness ($W_L/x$) is four times greater for the same beam width b. However, utilizing two beams, with one on each side of the slider, the width of each beam is $b_t/2$ thereby reducing the lateral stiffness by a factor of eight. As can be seen from Equation 2, this reduction in stiffness is a result of lateral stiffness ($W_L/x$) proportional to the width cubed ($b^3$). Since the width of each beam is $b_t/2$, each beam is reduced in stiffness by a factor of 8 (i.e., $(b_t/2)^3 = (b_t^3/8)$) and the pair of beams is reduced in stiffness by a factor of 4 (8÷2).

Accordingly, the net effect of the added constraint generated by connecting the beams in parallel (which increases the lateral stiffness by a factor of 4) in combination with the reduction in stiffness by reducing the beam width to $b_t/2$ is that the lateral stiffness for two parallel beams is the same as a single cantilever beam with the same total width. Therefore, two or more beams having their ends fixed and acting on either side of the slider may be modeled using a single cantilever beam model having the same total width.

Assuming the vertical load force $W_v$ is approximately 40 mN, with an elastic modulus E of 150 GPa, a beam length of 1000 μm, a beam depth of 200 μm and a maximum fiber stress of 100 MPa, Equation 1 gives us a required total beam width ($b_t$) of 60 μm. Applying these values to Equation 2, the lateral stiffness ($W_L/x$) is approximately to be 1620 N/m.

Assuming a lateral deflection (X) of approximately 10 μm, a lateral actuator force $W_L$ of 16.2 Mn would be required for deflection. However, this required lateral actuator force $W_L$ is 10 to 100 times greater than the force current microactuators are able to generate. Accordingly, there is a need for narrower microbeams in order to reduce lateral stiffness and operate within the range of force generated by current microactuators.

In the case where n beams are being utilized in parallel, the width of each beam is given by $b_t/n$. Inserting this variable into Equation 2, the total lateral stiffness ($W_L/x$) is given by Equation 3.

$$\frac{W_L}{x} = \frac{nEd}{L^3}\left(\frac{b_t}{n}\right)^3 \quad \text{Equation 3}$$
$$= \frac{Edb_t^3}{L^3 n^2}$$

Replacing $b_t$ with the function given in Equation 1, a total lateral stiffness $W_L/x$ is defined by Equation 4.

$$\frac{W_L}{X} = \frac{216 EW_v^3}{\sigma^3 d^5 n^2} \quad \text{Equation 4}$$

Note that the lateral stiffness ($W_L/x$) decreases to the fifth power of the depth (d) and with the square of the number of beams (n) acting in parallel. In order to minimize the lateral stiffness ($W_L/x$) it is desirable to maximize the depth (d) of the beam and maximize the total number of beams (n). Although it is desirable to maximize the depth (d) of the beam, the depth is limited as a practical matter by the space available. The depth (d) may also be limited by conventional processing capabilities.

In a similar manner, the total number of beams (n) is also limited by conventional process capabilities. Because the beams must have a minimum width to be manufactured reliably and perform reliably, (assuming the beams are etched out of the wafer material), only a very limited number of beams may be utilized.

However, if the beams are deposited onto the surface of a temporary support structure etched into the wafer as described hereinafter, the beams may be extremely narrow. It is contemplated that each beam may have a width of less than 1000 Å if desired. Assuming a depth of 200 micrometers, it would then be possible to achieve an incredible 2000:1 aspect ratio, wherein the aspect ratio is defined by the depth of the beam (d) divided by the width of the beam (b).

Note also in Equation 4 that the lateral stiffness ($W_L/x$) is not affected by the length (L), because the length variable is cancelled by inserting the function of Equation 1 into Equation 3. In addition, the total beam width ($b_t$) increases with length (L) per Equation 1 such that a longer length (L) allows a larger number of beams (n) assuming a lower limit on beam width (b). As such, an increase in length indirectly reduces the lateral stiffness ($W_L/x$).

As established above, the required total beam width $b_t$ is approximately 60 μm. Dividing the total beam width ($b_t$) by the number of beams (n), the lateral stiffness ($W_L/x$) may be calculated using Equation 3 or Equation 4 with the assumed values $W_v$, L, σ, d and E as used previously. The resulting lateral stiffness for using a plurality of beams ranging from 2 to 240 is represented in Table 1.

TABLE 1

| Beam Width (b) (μm) | No. of Beams (n) | Lateral Stiffness ($W_L/x$) (N/m) |
|---|---|---|
| 30 | 2 | 1620 |
| 15 | 4 | 405 |
| 10 | 6 | 180 |
| 7.5 | 8 | 101 |
| 6 | 10 | 64.8 |
| 5 | 12 | 45.0 |
| 3.75 | 16 | 25.3 |
| 3 | 20 | 16.2 |
| 2.5 | 24 | 11.3 |
| 2 | 30 | 7.2 |
| 1.5 | 40 | 4.05 |
| 1 | 60 | 1.80 |
| 0.5 | 120 | 0.450 |
| 0.25 | 240 | 0.113 |

It is also important that the natural frequency of the microactuator suspension 31 be significantly less than the servo bandwidth of the feedback system in order to ensure stable operation. For example, if a 2.5 kHz servo bandwidth is utilized, a microactuator suspension 31 a natural frequency of less than 1 kHz is desirable. Assuming a mass of 2.1 mg, the maximum lateral stiffness is 82.9 N/m in order to maintain stable operation. With reference to Table 1, it is apparent that 10 individual beams results in a lateral stiffness ($W_L/x$) of 64.8 N/m, thus satisfying the maximum lateral stiffness required to maintain stable operation. Also with reference to Table 1 it is apparent that the use of 8 individual beams with a resulting lateral stiffness of 101 N/m is too stiff, thereby increasing the potential for unstable modes.

It is also desirable to minimize the power dissipation of the microactuator 32 by reducing the force required to deflect the microactuator tongue 33. This may be accomplished by minimizing the lateral stiffness ($W_L/x$) of the microbeams 34.

Assuming that 10 individual microbeams 34 render acceptable stable performance within the physical parameters imposed on the design of the microactuator assembly 30, each of the microbeams must have a width of approximately 6 μm (see Table 1). However, the feasibility of using conventional DRIE (Deep Reactive Ion Etching) equipment to manufacture microbeams having a width of 6 μm and a depth of 200 μm is questionable because the reliability and output of such a process may not be economically justifiable. In addition, the feasibility of etching microbeams having a width of 3 μm or less in a depth of 200 μm is highly questionable using conventional process techniques. Accordingly, an alternative manufacturing process is desirable.

Figure 3:
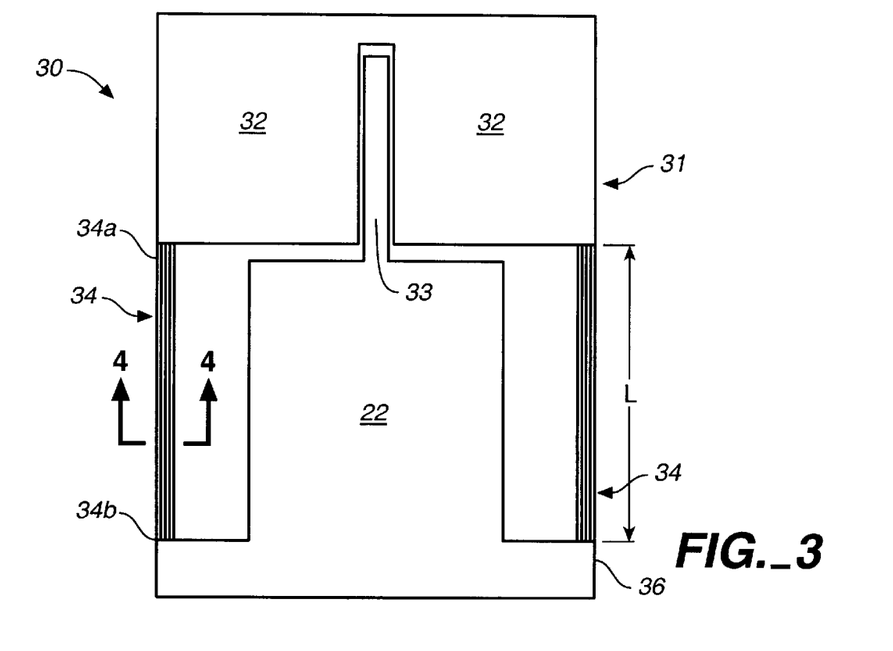
FIG. 3 is a top view of a microactuator assembly of the present invention illustrating the use of 10 microbeams.

Refer now to FIG. 3 which illustrates a top plan view of a microactuator assembly 30 of the present invention. The microactuator assembly 30 depicted in FIG. 3 is substantially similar to the microactuator assembly depicted in FIG. 2 and accordingly, similar elements are numbered the same. Note however, that FIG. 3 is a schematic representation of the microactuator assembly 30, and thus omits some detail already clearly depicted in FIG. 2.

With continued reference to FIG. 3, microactuator assembly 30 includes a microactuator suspension 31 incorporating microactuators 32 on either side of microactuator tongue 33. Microactuator tongue 33 is connected to slider 22 such that lateral displacement of microactuator tongue 33 by microactuators 32 causes corresponding translational movement of slider 22 and the transducer mounted thereon. Microactuator assembly 30 also includes a plurality of microbeams 34 disposed on either side of the slider 22. A proximal portion 34a of the microbeams 34 are connected to the stator portion 35 of the microactuator suspension 31. In a similar manner, the distal portion 34b of the microbeams 34 is connected to the rotor portion 36 of the microactuator suspension 31. With this arrangement, the proximal portion 34a of the microbeams 34 remains fixed relative to the stator portion 35 of the microactuator suspension 31. Similarly, the distal portion 34b of the microbeams 34 remains fixed relative to the rotor 36 of the microactuator suspension 31. With this arrangement, a distal portion 31b of the microactuator suspension 31, and consequently the slider 22 and transducer is able to move in a bilateral direction relative to the stator portion 35 of the microactuator suspension 31.

Figure 4:
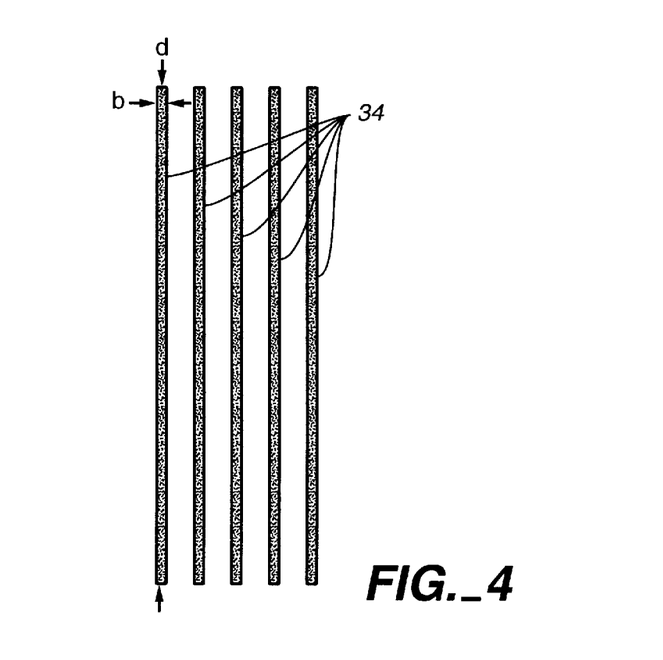
FIG. 4 is a cross-sectional view taken along line 4—4 in FIG. 3.

Refer now to FIG. 4 which illustrates a cross-sectional view of the microbeams 34 taken along line 4—4 in FIG. 3. Each of the microbeams 34 has a length (L), a depth (d) and a width (b). In this particular embodiment, ten microbeams 34 are illustrated with five microbeams on either side of the slider 22. The microbeams 34 preferably have a depth of approximately 200 μm, a length of 1000 μm and a width of 6 μm.

A microbeam having a depth of approximately 200 μm and a width of 6 μm results in an aspect ratio of approximately 30:1. It is within the scope of the present invention to have microbeams 34 having an aspect ratio of greater than 30:1. It is contemplated that the microbeams 34 may preferably have an aspect ratio of 60:1 or more, and more preferably to have an aspect ratio of 90:1 or more, and most preferably to have an aspect ratio of 120:1 or more.

It is desirable that the microbeams 34 of the present invention be fabricated by either etching the beams out of the silicon (Si) substrate, or by using a silicon reusable mold upon which the beam material (e.g., polysilicon) is applied. However, these two manufacturing processes have limitations that render them unsuitable for manufacturing the microbeams 34 as contemplated herein. For example, etching the microbeams 34 out of a silicon substrate using a conventional DRIE process pushes the etching equipment to its limits, particularly when attempting to fabricate beams having an aspect ratio greater than 33:1 (e.g., b=6 micrometers, d=200 micrometers). Pushing the DRIE equipment to its limit raises serious concerns regarding the quality and quantity of the components which ultimately determine the economic feasibility of such a process. Utilizing a reusable silicon mold to manufacture the microbeams 34 is undesirable because a relatively long etch step is required in hydrofluoric acid in order to release the part from the mold. This hydrofluoric acid release step is not compatible with all components that may be utilized on the microactuator assembly 30. For example, micromagnetic actuators 32 may be utilized on the microactuator assembly 30 and are typically fabricated by building up thin layers of poly silicon or the like. The multi-layered polysilicon structure is not compatible with a relatively long etch step in hydrofluoric acid. Accordingly, there is a need for improved manufacturing process, capable of reliably and efficiently manufacturing microbeams 34 having an aspect ratio greater than about 33:1.

The manufacturing process of the present invention results in a microactuator suspension 31 fabricated from bulk silicon in standard wafer form and microbeams 34 fabricated from thin layers of deposited material, such as Titanium, Silicon Nitride, Tungsten, Molybdenum, Nickel, or other suitable material. As such, the width (b) of the microbeams 34 is determined by the thickness of the deposited material. The deposition process of the present invention may result in a layer thickness in a range of approximately 1000 Å to several μm, and possibly several tens of μm.

The manufacturing method of the present invention may be utilized to manufacture virtually any number of microbeams 34 having relatively large aspect ratios. By way of example, not limitation, assume that the desired lateral stiffness or lateral spring constant is between 5 and 10 N/m. Referring to Table 1, microbeams 34 having a depth of 200 μm and a length of 1000 μm made of silicon operating under a stress of 100 MPa due to a 4 gram vertical load must have a width of 2 μm with 30 microbeams 34 acting in parallel. Note that if a different material were used to manufacture the microbeams 34 (e.g. Titanium), the microbeams could be manufactured slightly wider resulting in the same lateral stiffness ($W_L/x$) due to the slightly lower elastic modulus E. Note also that the number of beams could be increased when utilizing a different material such as Titanium.

To illustrate the manufacturing method of the present invention by way of example, not limitation, assume that 32 microbeams will be utilized having a width (b) of 2 μm and made from Titanium. Because the microbeams will be manufactured by depositing material on a substrate, 32 deposition surfaces are required. This arrangement will require 16 temporary microbeam substrates, with 8 on each side.

Figure 5:
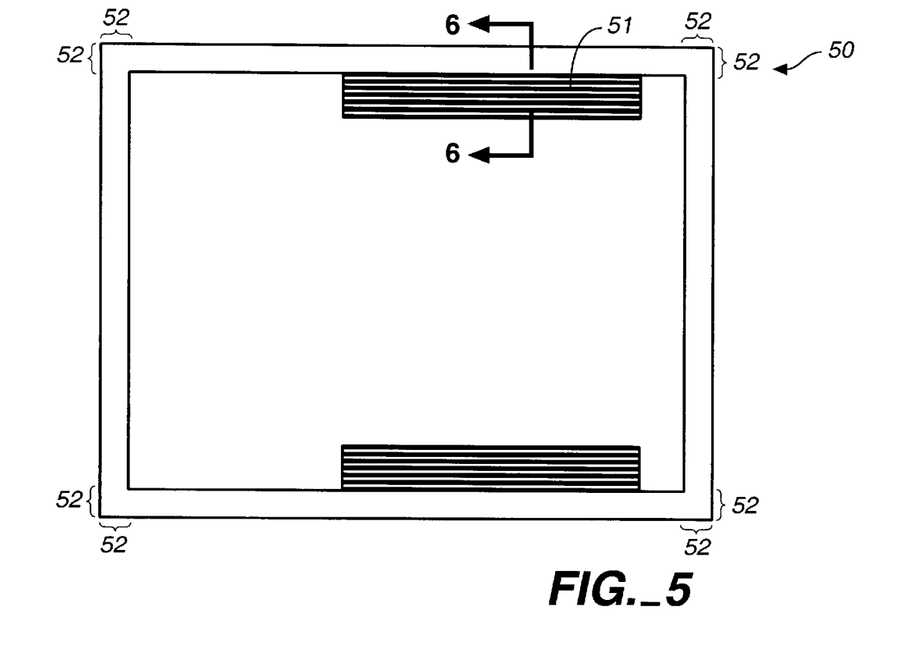
FIG. 5 is a top view of a microactuator assembly of the present invention after slots have been etched.
Figure 6:
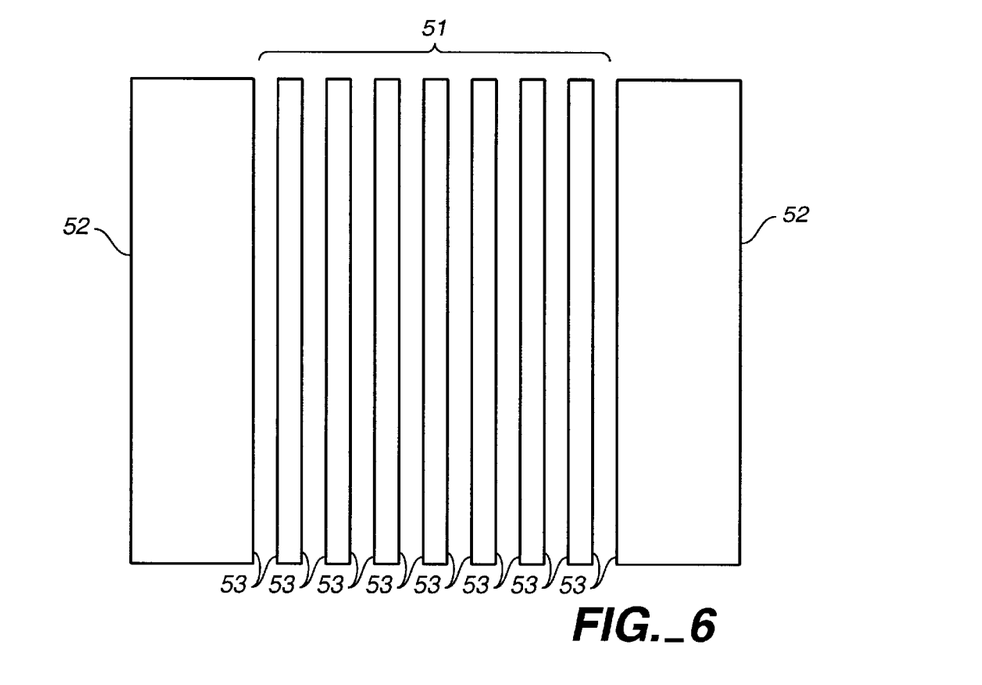
FIG. 6 is a cross-sectional view taken along lines 6—6 in FIG. 5.

Refer now to FIG. 5 which illustrates a conventional silicon wafer 50 having 8 slots etched into the wafer 50 using conventional DRIE etching techniques. The wafer 50 also includes portion 52 to be removed using subsequent etching steps in order to define the remainder of the microactuator suspension 31. Etching slots in the wafer 50 forms temporary microbeam substrates 51 having a plurality of substrate surfaces 53 best seen in FIG. 6. With this arrangement, microbeam material may be deposited onto each of the substrate surfaces 53 to form the microactuator beams 34. In this illustrative embodiment, both the slots and the temporary silicon beams 51 have a width of approximately 10 μm.

Figure 7:
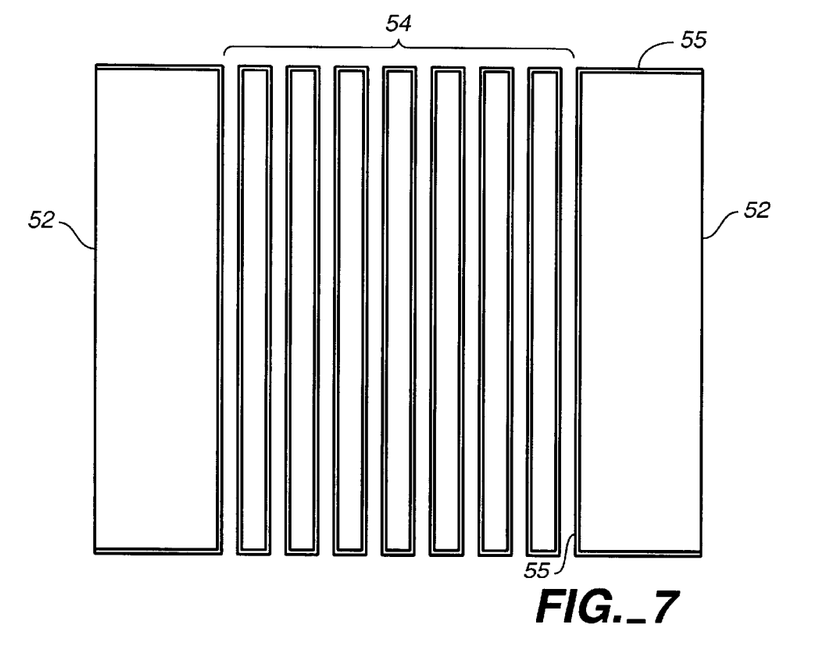
FIG. 7 is a cross-sectional view as in FIG. 6 after deposition of the beam material.

With reference to FIG. 7, a microbeam coating 55 is applied to the microbeam substrate 51 resulting in a coated microbeam substrate 54. The coating 55 may be selected from a group of materials such as Titanium, Tungsten, Molybdenum, Nickel, Silicon Nitride, or other suitable materials. Preferably, the microbeam coating 55 is applied utilizing a CVD deposition process. The CVD deposition process is capable of a relatively uniform coating, particularly with Silicon Nitride, which is critical when manufacturing high aspect ratio beams. In some instances, however, it is desirable to have a somewhat thinner coating along the inside surface of the structure in order to improve the vertical strength to lateral stiffness ratio as described in co-pending application Ser. No. 09/048,750 filed on Mar. 26, 1998 entitled MICROACTUATOR SUSPENSION WITH MULTIPLE "I" SHAPED MICROBEAMS.

Figure 8:
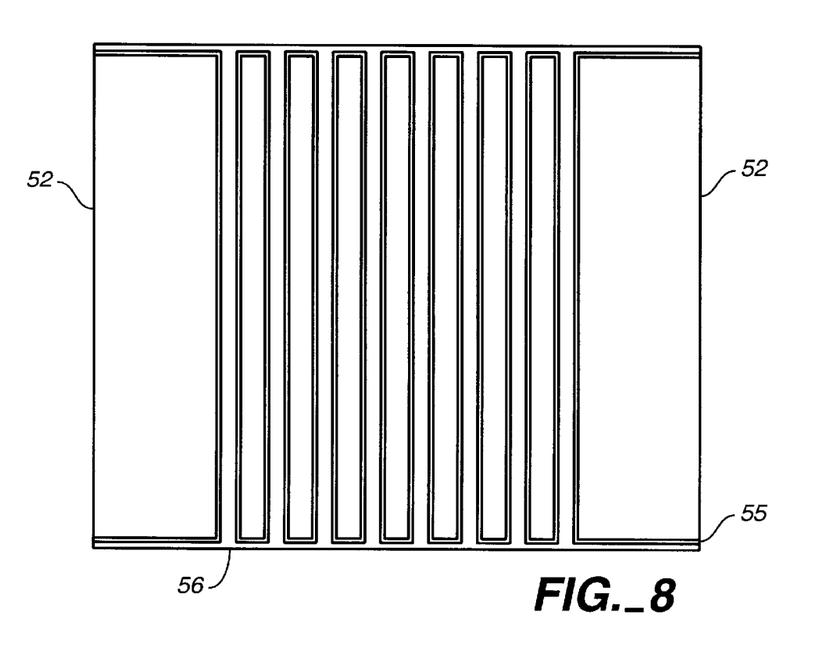
FIG. 8 is a cross-sectional view as in FIG. 6 after the gaps have been filled.

After the coating 55 has been applied to the substrate surfaces 53 resulting in a coated microbeam substrate structure 54, a temporary filler material 56 is applied, as best seen in FIG. 8. The temporary filler 56 prevents the slots from interfering with subsequent processing, such as photoresist coating steps. Preferably, the filler material 56 is a UV or heat curable epoxy or Silicon Dioxide applied by CVD or other suitable polymer that does not dissolve in a photoresist solvent. Such suitable materials must also be adapted to be removed using conventional techniques without damaging the rest of the coatings and substrates. For example, the filler material 56 may be removed utilizing an oxygen plasma or other selective ion etching technique.

Figure 9:
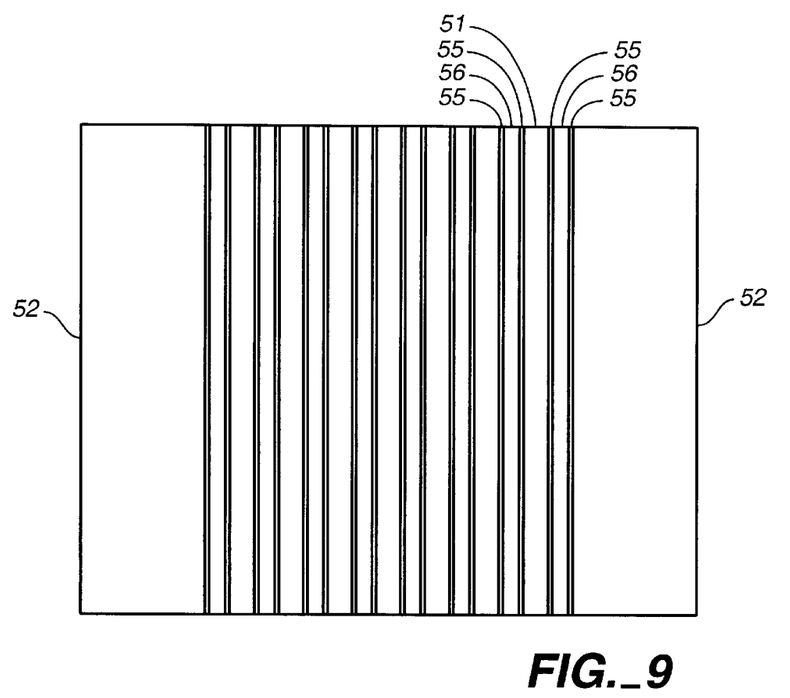
FIG. 9 is a cross-sectional view as in FIG. 6 after lapping or etching back to the original substrate.

With reference to FIG. 9, after the filler material 56 has been cured, the top and bottom surfaces (as seen in cross-section) are removed to expose the original substrate 51. The top and bottom surfaces are exposed in order to expose the microbeam substrate 51 for subsequent removal. The surfaces may be removed by employing either lapping or ion etching techniques. The ion etching techniques involves the use of two etching steps, one to remove the temporary fill material 56 and another to remove a top portion of the substrate material 51. Preferably, a lapping process is utilized in order to produce a more uniform planar surface, which is desirable for subsequent photoprocessing steps.

Figure 10:
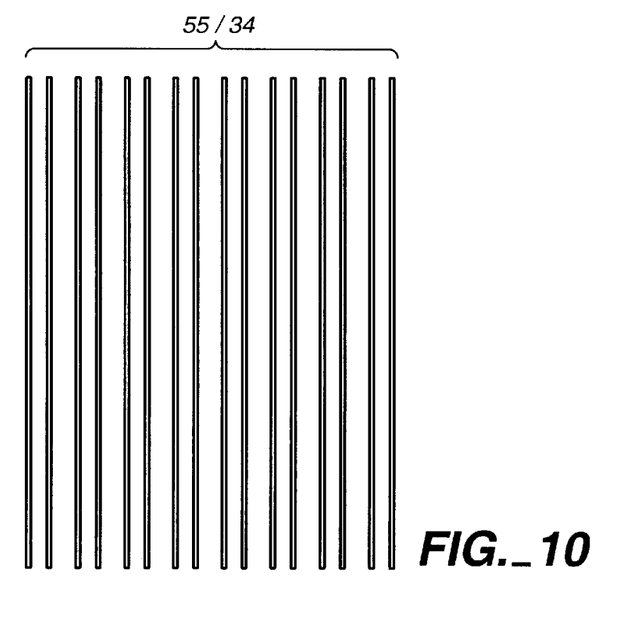
FIG. 10 is a cross-sectional view as in FIG. 6 after removing the original substrate and fill material, thus exposing the microbeams.

After the lapping or ion etching process is complete thus exposing the original substrate material 51, the remaining substrate 51 may be removed utilizing an etching process such as DRIE. Prior to removing the substrate material 51, the remainder of the microactuator suspension 31 is masked to prevent removal thereof by the etching process. The remaining filler material 56 may be removed utilizing one of the techniques mentioned previously such as by an oxygen plasma or other selective ion etch technique. After the filler material 56 and the substrate material 51 have been removed, the remaining material comprises the deposition coating 55 resulting in a plurality of microbeams 34 as illustrated in FIG. 10. These microbeams are, for example, 2 μm wide and 200 μm deep. However, the width of the microbeams 34 may be modified by varying the deposition time. Changing the deposition time is preferred versus relying on lithographic accuracy or control of etched wall angles to a fraction of a degree (as in DRIE) during the formation of the substrate 51.

The ability to make microbeams of less than 1 μm in width also makes microbeams having a length less than 1000 μm practical. Using the same vertical load and stress values of 4 grams and 100 MPas, and a depth of 200 μm, with a shortened beam length of 200 μm, Equation 1 gives the required total beam with of 12 μm. As shown below in Table 2, reducing both the total width and length of the microbeams results in a similar if not the same lateral stiffness/spring constant.

TABLE 2

| Beam Width (μm) | No. of Beams (n) | Lateral Stiffness ($W_L/x$) (N/m) |
| --- | --- | --- |
| 6 | 2 | 1620 |
| 3 | 4 | 405 |
| 2 | 6 | 180 |
| 1.5 | 8 | 101 |
| 1 | 12 | 45.0 |
| 0.75 | 16 | 25.3 |
| 0.5 | 24 | 11.3 |
| 0.4 | 30 | 7.2 |
| 0.25 | 48 | 2.8 |
| 0.2 | 60 | 1.80 |
| 0.15 | 80 | 1.01 |
| 0.1 | 120 | 0.45 |
| 0.075 | 160 | 0.253 |
| 0.05 | 240 | 0.113 |

Note that the stress due to a constant lateral deflection on the microbeam 34 does not increase as the beam length (L) is decreased, and that stress is generally low for narrow microbeams. For example, with reference to Table 2, 24 parallel beams results in a bending stress of 49 MPa due to a 10 μm lateral deflection (x), which is considerably below the yield strength of possible materials used to manufacture the microbeams. Note also that the lateral bending stress at constant deflection is inversely proportional to the width of the individual microbeams and thus inversely proportional to the number of microbeams (n).

From the foregoing, it is apparent that the method and apparatus of the present invention results in a microactuator assembly wherein the microactuator suspension has a sufficiently low lateral stiffness to vertical strength ratio to microactuate the slider in the off-track direction utilizing low-force microactuators. In particular, the present invention provides a microactuator assembly having beams divided into a plurality of microbeams having the same overall width. By dividing the conventional beam into a plurality of microbeams, the lateral stiffness of the microactuator assembly may be reduced by a full magnitude. In this manner, the microactuator suspension in the present invention enables the use of low-force microactuators.

The manufacturing method of the present invention provides a process to make high aspect ratio microbeams both reliably and efficiently. The method of manufacture also permits the microbeams to be made of materials different from that of the remainder of the microactuator assembly. For example, it is possible to manufacture the microbeams out of titanium, tungsten, molybdenum, nickel, silicon nitride, or other suitable materials.

Although the present invention has been described with reference to preferred embodiments, workers skilled in the art will recognize that changes may be made in form and detail without departing from the spirit and scope of the invention.

What is claimed is:

1. A microactuator suspension for use in a disc drive with a microactuator, the microactuator suspension comprising:
   a stator portion for connection to a gimbal to receive a pre-load force;
   a rotor portion for connection to a slider; and
   a plurality of substantially parallel microbeams having a proximal end connected to the stator portion and a distal end connected to the rotor portion such that actuation of the microactuator causes substantially lateral movement of the rotor portion relative to the stator portion, wherein the microbeams have an aspect ratio of 30:1 or more and wherein the pre-load force is transferred to the rotor portion through the plurality of microbeams.

2. A microactuator suspension as in claim 1, wherein the microbeams have an aspect ratio of 60:1 or more.

3. A microactuator suspension as in claim 1, wherein the microbeams have an aspect ratio of 90:1 or more.

4. A microactuator suspension as in claim 1, wherein the microbeams have an aspect ratio of 120:1 or more.

5. A microactuator suspension as in claim 1, wherein the microbeams are manufactured from a material that is different than that of the stator.

6. A microactuator suspension as in claim 5, wherein the microbeams are made of Titanium.

7. A microactuator suspension as in claim 5, wherein the microbeams are made of Tungsten.

8. A microactuator suspension as in claim 5, wherein the microbeams are made of Molybdenum.

9. A microactuator suspension as in claim 5, wherein the microbeams are made of Nickel.

10. A microactuator suspension as in claim 5, wherein the microbeams are made of Silicon Nitride.

11. A microactuator suspension for use in a disc drive having a microactuator, the microactuator suspension comprising:
- a stator portion for connection to a gimbal;
- a rotor portion for connection to a slider; and
- a plurality of substantially parallel deposited microbeams having a proximal end connected to the stator portion and a distal end connected to the rotor portion such that actuation of the microactuator causes substantially lateral movement of the rotor portion relative to the stator portion, wherein at least two of said plurality of substantially parallel microbeams are disposed on substantially opposite sides of a slider, and wherein the microbeams are made by depositing a microbeam material onto a substrate and subsequently removing the substrate.

12. A disc drive data storage system, comprising:
- a disc mounted to a motor for rotating the disc about an axis, the disc having a surface for storing data thereon;
- an access arm having a proximal end and a distal end;
- a slider connected to the distal end of the access arm;
- a means for microactuating the slider; and
- means for suspending the slider, relative to the means for microactuating, and for transmitting a pre-load force to the slider, such that, upon microactuating the slider, the slider moves in a substantially lateral direction relative to the access arm.

13. A microactuator suspension in a disc drive data storage system which includes a microactuator, the microactuator suspension including:
- a stator portion configured to receive a pre-load force from a head suspension element;
- a rotor portion configured for connection to a slider; and
- a plurality of substantially parallel microbeams, coupled to the stator portion and the rotor portion, arranged to transfer the pre-load force from the stator portion to the rotor portion such that actuation of the microactuator causes substantially lateral movement of the rotor portion relative to the stator portion, wherein at least two of said plurality of substantially parallel microbeams are disposed on substantially opposite sides of a slider.

\* \* \* \* \*